Patented Dec. 11, 1945

2,390,765

UNITED STATES PATENT OFFICE 2,390,765

REFRACTORY COATING MATERIAL

Henry H. York, Sydney, New South Wales, and William Michael Dummett, Bondi, near Sydney, New South Wales, Australia; said Dummett assignor to said York No Drawing. Application October 8, 1943, Serial No. 505,578. In Australia October 21, 1942

2 Claims. (Cl. 106—57)

This invention has been devised to provide a refractory coating material especially for foundry cores and the like. The coating will withstand the heat of casting operations in high heat metals; it forms a smooth surface on the core which surface resists penetration by the metal into the core and its use results in a smooth surface casting.

The manufacture of this refractory coating material is based on the discovery in our copending application 505,577 of the use of zirconium silicate bonded with phosphoric acid. Resulting from this discovery, experiments were carried out with the object of making a coating material for the stated purpose.

In this development it was ascertained that zirconium silicate ground or in powder form or zirconium oxide can be held in suspension in emulsion form or as a wash with titanium oxide dextrin bentonite and water. In this form the coating can be sprayed or painted on to the core or other surface to be treated.

In an example form of the invention a mixture is made containing—

| | Parts by weight |
|---|---|
| Titanium oxide | 1 |
| Bentonite | 1 |
| Dextrin | 1 |
| Phosphoric acid | $\frac{1}{10}$ |
| Methylated spirits | $\frac{1}{10}$ |
| Zirconium silicate | 18 |
| Water | 48 |

The methylated spirit is first mixed with the dextrin to prevent the loss of colloidal property in the dextrin. Then the several ingredients are mixed together resulting in an emulsion which holds the heavy zircon silicate in suspension and provides an even flowing material for spraying or painting which will adhere to the surface to which it is applied.

In place of the specific example it will be appreciated that for bentonite other colloidal clays may be used. Likewise in place of dextrin there may be used a mucilage of gum acacia or gum tragacanth or other gummy or resinous material or dispersing agents as, for example, triethanolamine or glycerine or vegetable oils. In place of titanium oxide there may be used a dense ingredient such as barium sulphate or the like. In place of methylated spirit there may be used other organic or inorganic chemical which will prevent the dextrin going into solution and thus losing its colloidal property.

We claim:

1. Refractory coating material comprising zirconium silicate and titanium oxide in suspension with bentonite and dextrin in the presence of water and methylated spirit.

2. Refractory coating material comprising zirconium silicate, 18 parts by weight, titanium oxide, 1 part by weight, and phosphoric acid, one tenth part of one part by weight, in suspension with bentonite, one part by weight, and dextrin, one part by weight, in the presence of water, 48 parts by weight, and methylated spirit, one tenth of one part by weight.

HENRY H. YORK.
WILLIAM MICHAEL DUMMETT.